US00RE34526E

United States Patent [19]

Pessier

[11] E Patent Number: Re. 34,526

[45] Reissued Date of Patent: Feb. 1, 1994

[54] TWO CONE BIT WITH NON-OPPOSITE CONES

[75] Inventor: Rudolf C. O. Pessier, Houston, Tex.

[73] Assignee: Baker Hughes Incorporated, Houston, Tex.

[21] Appl. No.: 940,561

[22] Filed: Sep. 4, 1992

Related U.S. Patent Documents

Reissue of:

[64] Patent No.: 4,953,641
Issued: Sep. 4, 1990
Appl. No.: 344,134
Filed: Apr. 27, 1989

[51] Int. Cl.[5] ..... E21B 10/08

[52] U.S. Cl. ..... 175/353; 175/355; 175/376

[58] Field of Search ..... 175/350, 353, 355, 376, 175/398, 414, 415

[56] References Cited

U.S. PATENT DOCUMENTS

| | | | |
|---|---|---|---|
| 930,759 | 8/1909 | Hughes | 175/353 |
| 1,263,802 | 4/1918 | Reed | 175/353 |
| 2,340,492 | 2/1944 | Scott | 175/331 X |
| 2,571,930 | 10/1951 | Noble | 175/353 |
| 3,696,876 | 10/1972 | Ott | 175/353 X |
| 4,763,736 | 8/1988 | Varel, Sr. | 175/376 X |

FOREIGN PATENT DOCUMENTS

| | | | |
|---|---|---|---|
| 1223779 | 9/1966 | Fed. Rep. of Germany | 175/376 |

*Primary Examiner*—Terry Lee Melius
*Attorney, Agent, or Firm*—Mark D. Perdue

[57] ABSTRACT

A two-cone earth boring bit having non-opposite cones that minimize the tendency for off-center rotation or rough running. The bit is composed of two cones, each having a cantilevered bearing shaft with an axis extending inwardly and downwardly. A rotatable, generally conical cutter is mounted on each bearing shaft, each cutter having a conical gage surface to engage and define a borehole with a wall of [select] *ed* select gage diameter. The axis of one cutter is skewed relative to the other to cause the conical gauge surface of the two cones to engage the wall of the hole at points that are other than 180 degrees apart as compared to nonskewed cutters. These points are separated by a distance less than the selected gage diameter. A line between these points is separated from a line extending from one point through the [rotatable] *rotational* axis on the bit by a selected angle. The body of the bit and/or stabilizers are separated from the wall of the hole by a distance less than the selected gage diameter. [A line between these points is separated from a line extending from one point through the rotatable axis on the line bit by a selected angle. The body of the bit and/or stabilizers are separated from the wall of the hole by a distance less than the selected gage diameter.]

6 Claims, 2 Drawing Sheets

TWO CONE BIT WITH NON-OPPOSITE CONES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to earth boring and in particular to earth boring bits of the type having rotatable cutters with earth disintegrating teeth.

2. Background Information

Earth boring bits fall generally into two categories: (1) drag bits with a variety of forms including those with synthetic or natural diamond used for cutting elements; (2) those with rotatable cutters having earth disintegrating teeth formed of steel and other suitable metals, such as sintered tungsten carbide.

The rotatable cone type bits have generally two or three cones. The three-cone bit has enjoyed the greater commercial success for a number of reasons, including the fact that they "run smooth". Two-cone bits tend to run rougher, a condition that generates vibrations in the bit and drill string that impedes drilling and tends to be detrimental to the drilling rig and equipment.

It is advantageous to utilize two-cone bits, if they can be made to run smooth, in some types of earth formations. The softer formations can be effectively drilled with two-cone bits, which usually have longer teeth or cutting elements.

SUMMARY OF THE INVENTION

It is the general object of the invention to provide an earth boring bit of the two-cone type with features that minimize rotation off-center, rough running and reduce torque.

In accordance with the foregoing object, the invention may be summarized as a two-cone earth boring bit having non-opposite cones that minimize the tendency for off-center rotation or rough running. The bit is composed of two cones, each having a cantilevered bearing shaft with an axis extending inwardly and downwardly. A rotatable, generally conical cutter is mounted on each bearing shaft, each cutter having a conical gauge surface to engage and define a borehole with a wall of select gauge diameter. The axis of one cutter is skewed relative to the other to cause the conical gauge surface of the two cones to engage the wall of the hole at points that are other than 180 degrees apart as compared to nonskewed cutters. These points are separated by a distance less than the selected gauge diameter. A line between these points is separated from a line extending from one point through the rotational axis on the bit by a selected angle. The body of the bit and/or stabilizers are separated from the wall of the hole by a distance in a range from preferably one-fourth to one inch.

DESCRIPTION OF THE PREFERRED EMBODIMENT

Figure 1:
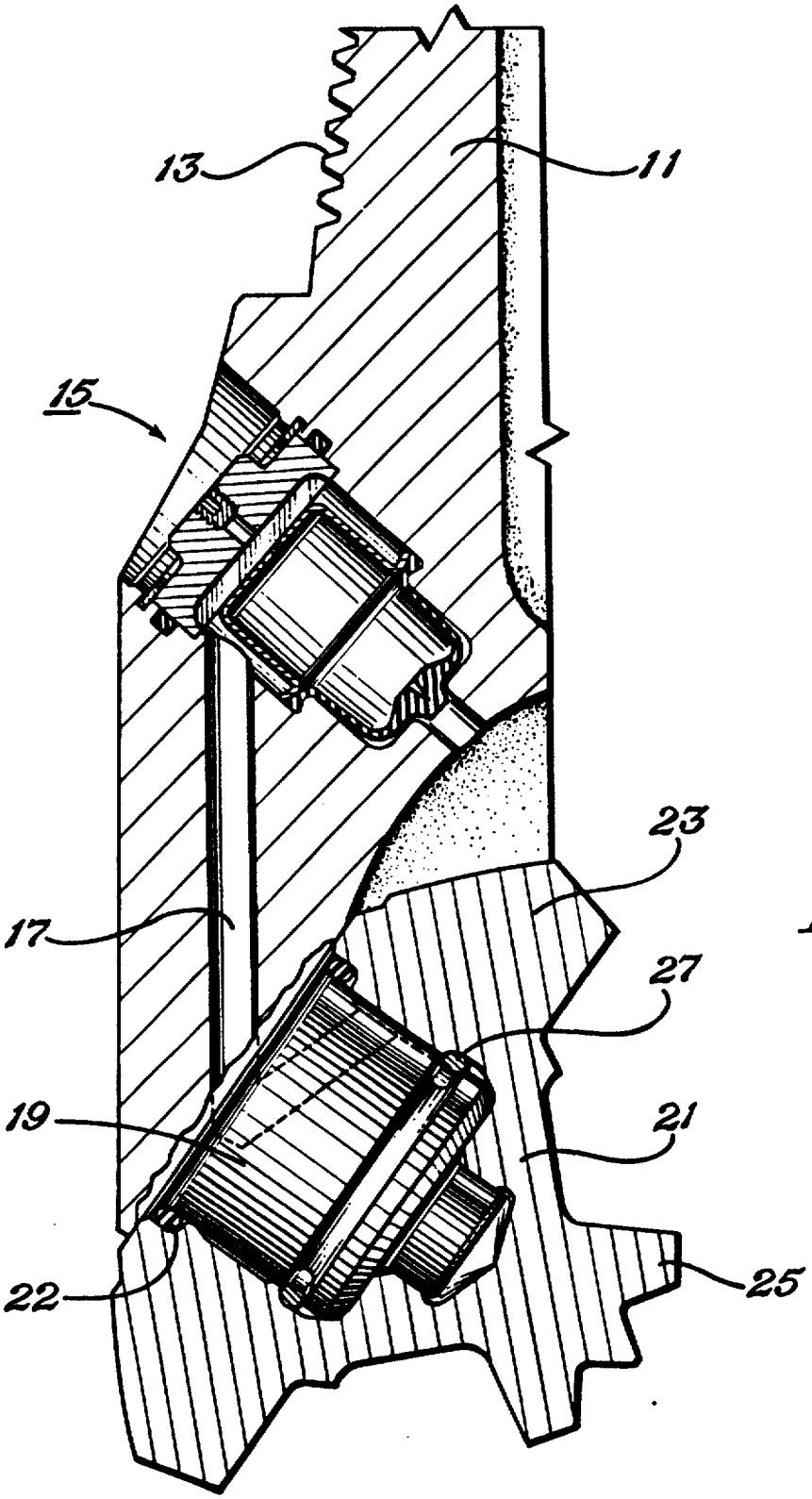
FIG. 1 is a fragmentary longitudinal sectional view of a portion of one section of a two-cone earth boring bit which embodies the principles of the invention.

The numeral 11 in the drawings represents a portion of a section of a two-cone bit having a shank threaded at 13 for connection to the drill string (not shown). This section includes a lubrication and pressure compensator means 15, the description of which may be seen with reference to U.S. Pat. No. 4,727,942, "Compensator for Earth Boring Bits", Mar. 1, 1988.

Lubricant is introduced through passages 17 to the surfaces of a bearing shaft 19, which is cantilevered from the section 13 to extend inwardly and downwardly.

A rotatable cutter 21, with rows of disintegrating teeth 23, 25 is secured to the bearing shaft 19 by a resilient snap ring 27. The description or construction of the preferred snap ring may be seen with reference to U.S. Pat. No. 4,344,658, "Earth Boring Bit with Snap Ring Cutter Retention", Aug. 17, 1982.

Lubricant is retained within the bearing surfaces of each cutter and bearing shaft by an O-ring seal 22 as described in U.S. Pat. No. 3,397,928, "Seal Means for Drill Bit Bearings".

Figure 2:
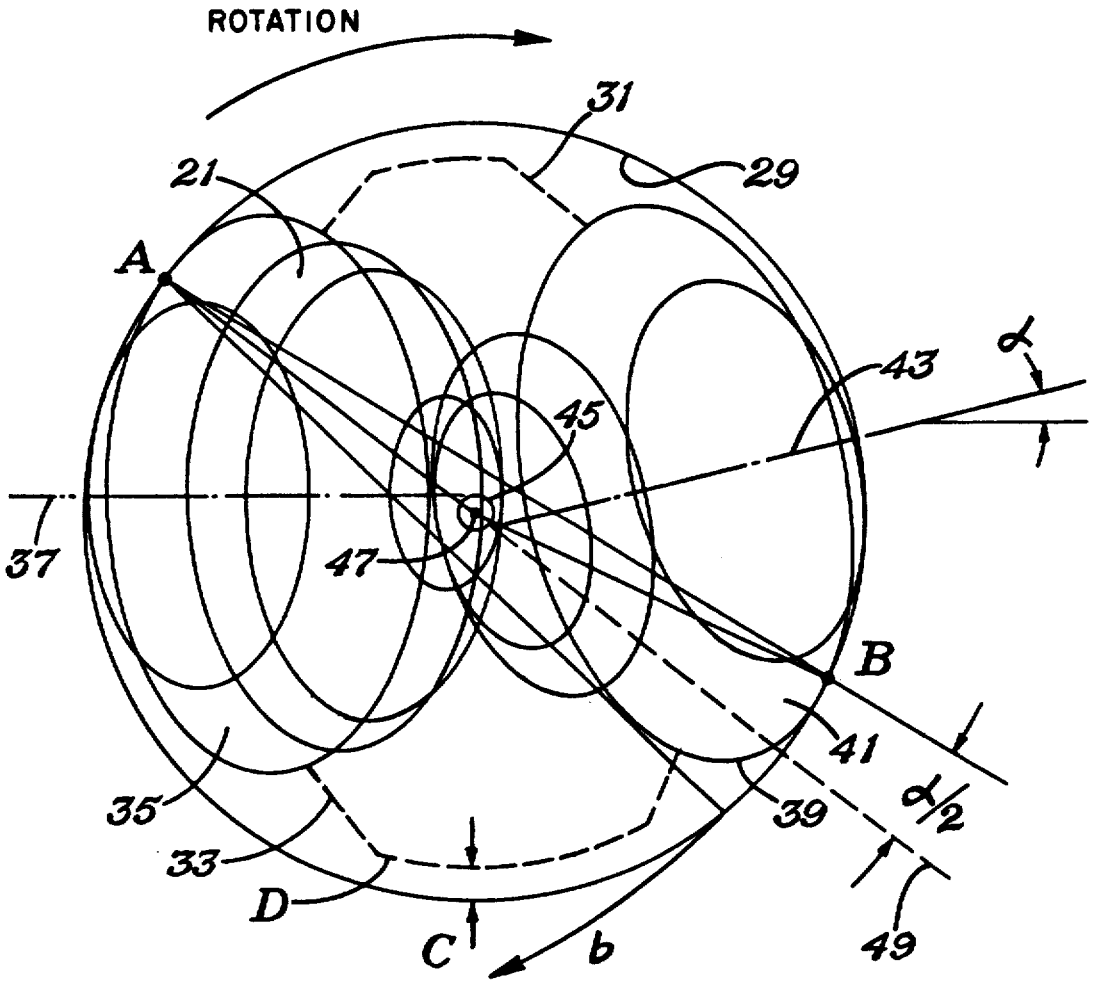
FIG. 2 is a schematic view of the two-cone bit of FIG. 1 as seen from above to show the relationship of the non-opposite cones.

FIG. 2 illustrates schematically a borehole with a wall 29 of selected gauge diameter. Two sections 13 (see FIG. 1) are welded to form a bit body, portions of which are represented by the numerals 31, 33 through which drilling fluid flows through passages and nozzles (not shown) to flush cuttings from the borehole to the surface of the earth.

Cutter 21 has conical gauge surface 35 that engages the borehole wall 29 at point A as it rotates about its axis 37. Cutter 39 has conical gauge surface 41 that engages the borehole wall 29 at point B as it rotates about its skewed axis 43. Both the cutters 21 and 29 are "offset" to be tangent with a circle 45 surrounding the centerline 47 which defines the rotational axis of the bit.

Cutter 39 is not only offset but is skewed at an angle $\alpha$ relative to the axis 37 of the cutter 21.

The portion 33 of the body of the cutter is separated by a distance C from the wall 29 of the bore hole.

Point A is the contact of gauge surface 35 with the borehole wall 29. Point B is the point of contact of surface 41 with the borehole wall 29. These points define the perimeter or gauge of the borehole as the bit rotates about the axis 47. The gauge diameter of the borehole is the sum of the distances between the axis 47 and point B plus axis 47 and point A.

The purpose of skewing the cutters is to cause the conical surfaces 35 of cutter 21 and 41 of cutter 39 to engage the wall 29 of the borehole at points A and B so that they are other than 180 degrees apart. As a result, the points A and B are separated by a distance which is less than the selected gauge diameter of the borehole, but cut a full diameter borehole when rotated about axis 47. Thus a line through points A and B is separated from a line 49 by an angle $\alpha/2$. Portion 33 of the body is separated from the wall of the borehole by the distance C.

During rotation, the bit tries to rotate intermittently about point A or point B because of varying forces acting on the cutters. For example, differences in forces occur because the rock is not homogeneous and the wall of the hole is not always a smooth cylinder. When it rotates about point A, point B rotates along path b, which is inside the borehole wall [39] *29* within an arc of [2] $\alpha$. Therefore, point B will not cut gauge until the bit starts rotating about axis 47. Rotation about point A is also limited by the clearance C. When the surface D engages the wall 29 of the hole, further rotation about point A will cease. The surface D also acts as a stabilizer that forces the bit to rotate around axis 47. Since point B moves on an arc inside the gauge diameter, there is no damage to the borehole wall or cutting over-gauge hole.

In the prior two-cone bits with cones 180 degrees apart, the distance between points A and B is the gauge diameter. Rotation about point A causes point B to move on an arc outside the hole gauge diameter. This produces an oversized hole and causes rough, off-center running. The conventional way to overcome this problem is to use a close-fitting stabilizer on the bit, which increases drilling torque and chances for getting stuck in the borehole.

Examples of successful dimensions and angles discussed above are as follows for a 7⅞ inch bit:

$\alpha = 13°$

C = 5/16 inch

Offset = 3/16 inch (radius of circle).

It should be apparent from the foregoing description that an invention having significant advantages has been produced. One advantage of the bit is the reduction of the tendency to damage the borehole wall due to running off-center. Therefore, the borehole will not be oversized, and the bit will tend to run smoother.

While the invention has been shown in only one of its forms, it should be apparent to those skilled in the art that it is not thus limited, but is susceptible to various changes and modifications without departing from the spirit thereof.

I claim:

1. An improved earth boring bit comprising:
a body composed of two sections;
a cantilevered bearing shaft with an axis extending inwardly and downwardly on each section;
a rotatable, generally conical cutter on each bearing shaft, said cutter having a conical gauge surface to engage and define a borehole with a wall of selected gauge diameter; *and*
the axis of one cutter being skewed *by an angle greater than zero degrees, but not greater than about 13 degrees* relative to the other to cause the conical gauge surfaces of the two cones to engage the wall of the hole at points that are other than 180 degrees apart;
[a line through said points being separated from a line from one of said points through the center of the bit by an angle not greater than about —degrees].

2. The invention defined by claim 1 wherein the body of the bit is separated from the wall of the hole by a distance in a range from one-fourth to one inch.

3. An improved earth boring bit comprising:
a body composed of two sections;
a cantilevered bearing shaft with an axis extending inwardly and downwardly on each section;
a rotatable generally conical cutter on each bearing shaft, said cutter having a conical gauge surface to engage and define a borehole with a wall of selected gauge diameter;
a pressure compensating and lubrication means in each section; and
the axis of one cutter being skewed *by an angle greater than zero degrees, but not greater than about 13 degrees* relative to the other to cause the conical gauge surfaces of the two cones to engage the wall of the hole at points that are other than 180 degrees apart;
[a line through said points being separated from a line from one of said points through the center of the bit by an angle not greater than about 13 degrees].

4. The invention defined by claim 3 wherein the body of the bit is separated from the wall of the hole by a distance in a range from one-fourth to one inch.

5. An improved earth boring bit comprising:
a body composed of two sections;
a cantilevered bearing shaft with an axis extending inwardly and downwardly on each section;
a rotatable, generally conical cutter on each bearing shaft, said cutter having a conical gauge surface to engage and define a borehole with a wall of selected gauge diameter;
a pressure compensating and lubricating means in each section;
a retainer means to secure each cutter to its associated shaft;
the axis of one cutter being skewed *by an angle greater than zero degrees, but not greater than about 13 degrees* relative to the other to cause the conical gauge surfaces of the two cones to engage the wall of the hole at points that are other than 180 degrees apart; and
the cutters having differing configurations at their conical gauge surface to cause a tendency of the bit to rotate about a selected one of said point;
[a line through said points being separated from a line from one of said points through the center of the bit by an angle not greater than about 13 degrees].

6. The invention defined by claim 5 wherein the body of the bit is separated from the wall of the hole by a distance in a range from one-fourth to one inch.

* * * * *

UNITED STATES PATENT AND TRADEMARK OFFICE

CERTIFICATE OF CORRECTION

PATENT NO. : Re.34,526

DATED : Feb. 1, 1994

INVENTOR(S) : Rudolf C. O. Pessier

It is certified that error appears in the above-identified patent and that said Letters Patent is hereby corrected as shown below:

In the abstract, line 8, replace "[select]ed select" with --selected--.

Signed and Sealed this

Fourteenth Day of March, 1995

*Attest:*

Bruce Lehman

BRUCE LEHMAN

*Attesting Officer*

*Commissioner of Patents and Trademarks*